Patented Jan. 2, 1951

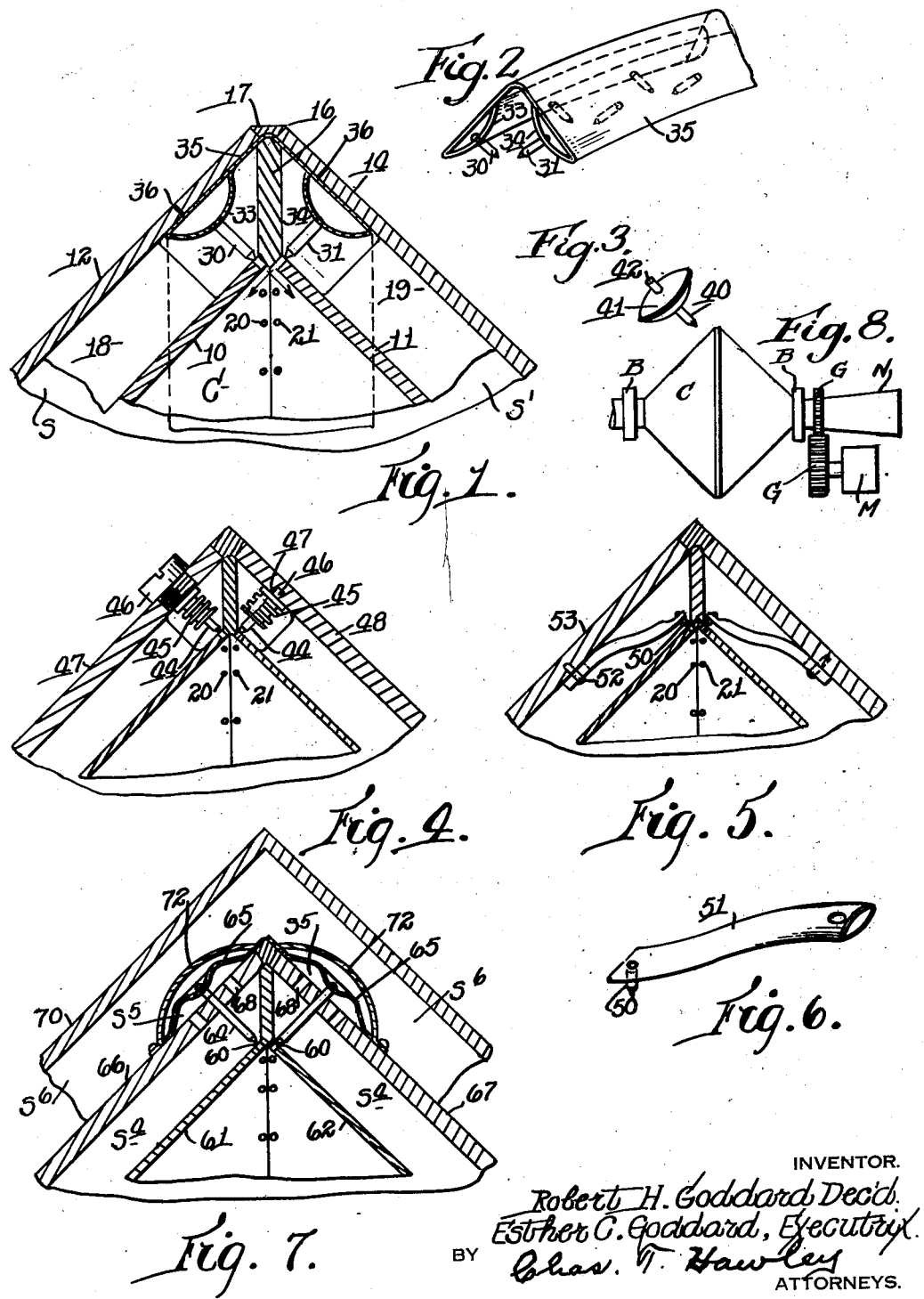

2,536,601

UNITED STATES PATENT OFFICE 2,536,601

FEED VALVE MECHANISM FOR ROTATING COMBUSTION CHAMBERS

Robert H. Goddard, deceased, late of Annapolis, Md., by Esther C. Goddard, executrix, Worcester, Mass., assignor of one-half to The Daniel and Florence Guggenheim Foundation, New York, N. Y., a corporation of New York Application February 7, 1948, Serial No. 7,017

6 Claims. (Cl. 60—44)

This invention relates to rotating combustion chambers adapted for use in rockets and rocket apparatus. In such combustion chambers, it is desirable to jacket and cool the chamber walls by the combustion liquids, and to utilize centrifugal force to feed the liquids to the combustion chamber at its point of maximum diameter. It is also desirable to prevent any flow of combustion liquids into the combustion chamber unless the chamber is rotating at or above a predetermined minimum speed.

It is the general object of the present invention to provide improved feed valve mechanism for a rotating combustion chamber, so designed that the valves are normally closed but with provision for opening the valves when the speed of rotation of the combustion chamber reaches or exceeds a predetermined minimum.

The invention further relates to arrangements and combinations of parts which will be hereinafter described and more particularly pointed out in the appended claims.

Preferred forms of the invention are shown in the drawing, in which

Fig. 1 is a sectional elevation of a portion of a combustion chamber with one form of this invention embodied therein;

Fig. 2 is a partial perspective view of the valve mechanism shown in Fig. 1;

Fig. 3 is a perspective view of a modified valve construction;

Fig. 4 is a view similar to Fig. 1 but showing bellows-operated valve members;

Fig. 5 is a view similar to Fig. 1 but showing valve members mounted on curved hollow tubes;

Fig. 6 is a perspective view of one of the tubes;

Fig. 7 is a view similar to Fig. 1 but showing a further modification; and

Fig. 8 is a side elevation of a rotating combustion chamber embodying the invention.

Referring to Fig. 8, a combustion chamber C having a discharge nozzle N is shown rotatably mounted on bearings B and adapted for rotation by a motor M through gearing G.

This type of rotating combustion chamber C comprises reversed conical chamber wall portions 10 and 11, and reversed conical casing members 12 and 14 which provide jacket spaces S and S' separated by an annular partition 16. The abutting edges of the wall portions 10 and 11 may be welded or otherwise secured to the inner edge of the partition 16, and the casing members 12 and 14 may be similarly secured to the outer edge of the partition, as by welding at 17.

Radially-disposed vanes 18 and 19 are mounted in the jacket spaces S and S' and hold the chamber walls and outer casing members in definite spaced relation. One combustion liquid is fed to the space S near the axis of the combustion chamber, and another combustion liquid is similarly fed to the space S'. As the combustion chamber rotates, the liquids are displaced outwardly by centrifugal force, and pressure is built up which feeds the liquids through spray openings 20 and 21 to the combustion chamber. The electric motor M may be used to effect rotation.

It is not desired that any flow of these liquids shall take place while the combustion chamber is at rest or until it reaches a predetermined speed of rotation. Valve pins 30 and 31 are accordingly provided for the spray openings 20 and 21, and these valve pins are mounted on thin hollow tubular members 33 and 34, which are in turn secured to and supported by an annular plate 35 (Fig. 2) mounted within the jacket casing members 12 and 14 and preferably extending over the annular partition 16.

The tubular members 33 and 34 should be of thin sheet metal or of other resilient and preferably heat-resistant sheet material and are of such contour that the pins 30 and 31 are normally seated to close the holes 20 and 21. But when the liquids in the spaces S and S' are forced outward and placed under pressure by centrifugal force, the pressure of the liquids will flatten or outwardly displace the parts 33 and 34, thus withdrawing the valve pins 30 and 31 from the spray openings. Bleed openings 36 may be provided to vent the spaces enclosed by the parts 33 and 34.

With this construction, it will be evident that the holes 20 and 21 will remain closed until the speed of rotation builds up enough centrifugal pressure to displace the pins 30 and 31 outwardly. This pressure may be arranged to open the valves at any desired speed of minimum rotation.

Instead of mounting a series of pins 30 and 31 on a single hollow member 33 or 34, each pin as 40 (Fig. 3) may be mounted on a separate hollow resilient and compressable member 41 provided with a stud 42 adapted to be seated in an opening in one of the jacket members 12 or 14. The operation is the same as previously described, except that each valve pin and operating member is a separate unit.

In Fig. 4 each valve member 44 is shown as supported by a normally-expanded bellows-member 45 which may be mounted on the inner end of a screw 46 threaded into a jacket member 47. As an alternative construction, the valve member 44 and bellows member 45 may be provided with a stud 46 (Fig. 4) adapted to be seated in a hole 47 in a jacket or casing member as 48.

With either of these constructions, the normally expanded bellows members 45 seat the pins 44 in the spray openings 20 and 21 but the pins are withdrawn as the members 45 are compressed by an increase in liquid pressure due to centrifugal force as the speed of rotation increases.

Similar results are attained by the construction shown in Figs. 5 and 6, in which the valve pins 50 are mounted on the free ends of curved tubular members 51, the opposite ends of which may be secured by screws 52 to the outer casing members 53. The tubes 51 are of such shape that the pins 50 are normally seated in the holes 20 and 21 but the tubes will straighten and withdraw the pins 50 as the pressure in the jacket spaces increased. With the parts rightly proportioned, the pins will be withdrawn on the attainment of pressure corresponding to the desired speed of rotation.

In the construction shown in Fig. 7, ports 60 in the chamber walls 61 and 62 are normally closed by pins 64 fixed in diaphragms 65 welded or otherwise secured to the outer faces of the jacket members 66 and 67. Openings 68 connect the jacket spaces S4 with the spaces S5 within the diaphragms 65. Increase in pressure in the jacket spaces S4 will obviously displace the diaphragms 65 outwardly and withdraw the pins 64 from the ports 60.

In some cases it is found desirable to provide a stationary outer casing 70 to enclose a space S6 within which substantial gas pressure may be maintained to offset the centrifugal pressure on the jacket members 66 and 67. When such an outer jacket 70 is used, shields 72 may be mounted over the diaphragms 65 to prevent the outside pressure from interfering with the operation of the diaphragms in response to increases in pressure in the jacket spaces S4.

In all forms of the invention, the valves are normally closed and are opened automatically on predetermined increase in centrifugal pressure.

Having thus described the invention and the advantages thereof, it will be understood that the invention is not to be limited to the details herein disclosed, otherwise than as set forth in the claims, but what is claimed is:

1. In combustion apparatus, a rotating combustion chamber, outer casing members enclosing separated jacket spaces about said combustion chamber for two combustion liquids, said chamber having a series of spray openings from each jacket space to said chamber, valve members in said jacket spaces to open and close said spray openings, and means to move said valve members in response to changes in centrifugal pressure in said jacket spaces and effective to withdraw said valve members from said spray openings on increase of liquid pressure in said jacket spaces.

2. The combination in combustion apparatus as set forth in claim 1, in which the means for moving the valve members comprises pressure-responsive devices mounted outside of said casing members but communicating with said jacket spaces and connected to said valve members, said devices being expansible by increase in pressure to withdraw said valve members, and shields to protect said devices from changes in external pressure.

3. The combination in combustion apparatus as set forth in claim 1, in which the means for moving the valve members comprises pressure-responsive devices in said jacket spaces on which said valve members are mounted and by which they are normally seated to close said spray openings, and said pressure-responsive members being deformable by increase in pressure in the associated jacket space to withdraw said valve members from said openings.

4. The combination in combustion apparatus as set forth in claim 3, in which the pressure-responsive members comprise diaphragms on which said valves are mounted and by which they are normally seated.

5. The combination in combustion apparatus as set forth in claim 3, in which the pressure-responsive members comprise bellows operators on which said valves are mounted and by which they are normally seated.

6. The combination in combustion apparatus as set forth in claim 3, in which the pressure-responsive members comprise pressure-deformable tubes on which said valves are mounted and by which they are normally seated.

ESTHER C. GODDARD,
*Executrix of the Last Will and Testament of Robert H. Goddard, Deceased.*

REFERENCES CITED

The following references are of record in the file of this patent:

UNITED STATES PATENTS

| Number | Name | Date |
| --- | --- | --- |
| 684,743 | Burger | Oct. 15, 1901 |
| 1,021,521 | Héroult | Mar. 26, 1912 |
| 1,189,484 | Raymond | July 4, 1916 |
| 2,395,114 | Goddard | Feb. 19, 1946 |